(12) United States Patent
Long et al.

(10) Patent No.: US 11,055,828 B2
(45) Date of Patent: Jul. 6, 2021

(54) VIDEO INPAINTING WITH DEEP INTERNAL LEARNING

(71) Applicant: Adobe Inc., San Jose, CA (US)

(72) Inventors: Mai Long, San Jose, CA (US); Zhaowen Wang, San Jose, CA (US); Ning Xu, Milpitas, CA (US); John Philip Collomosse, Surrey (GB); Haotian Zhang, Stanford, CA (US); Hailin Jin, San Jose, CA (US)

(73) Assignee: ADOBE INC., San Jose, CA (US)

( * ) Notice: Subject to any disclaimer, the term of this patent is extended or adjusted under 35 U.S.C. 154(b) by 158 days.

(21) Appl. No.: 16/407,915

(22) Filed: May 9, 2019

(65) Prior Publication Data

US 2020/0357099 A1 Nov. 12, 2020

(51) Int. Cl.
*G06T 5/00* (2006.01)
*G06N 3/04* (2006.01)
*G06K 9/62* (2006.01)

(52) U.S. Cl.
CPC ............ *G06T 5/005* (2013.01); *G06K 9/6256* (2013.01); *G06N 3/04* (2013.01); *G06T 5/002* (2013.01); *G06T 2207/10016* (2013.01); *G06T 2207/20081* (2013.01)

(58) Field of Classification Search
CPC .......... G06N 3/0454; G06N 3/08; G06N 3/04; G06N 3/088; G06N 20/00; G06T 2207/10016; G06T 2207/20081; G06T 2207/20084; G06T 7/215
See application file for complete search history.

(56) References Cited

U.S. PATENT DOCUMENTS

2018/0137389 A1* 5/2018 Mathieu ............. G06K 9/00718

OTHER PUBLICATIONS

Ulyanov, et al., "Deep Image Prior", The IEEE Conference on Computer Vision and Pattern Recognition (CVPR), Jun. 2018, 9 pages (Year: 2018).*
Barnes, et al., "A Randomized Correspondence Algorithm For Structural Image Editing", ACM Transactions on Graphics, 10 pages.
Barnes, et al., "A Survey of the State-of-the-Art in Patch-Based Synthesis", Computational Visual Media, 18 pages.

(Continued)

*Primary Examiner* — Ross Varndell
(74) *Attorney, Agent, or Firm* — F. Chau & Associates, LLC

(57) ABSTRACT

Techniques of inpainting video content include training a neural network to perform an inpainting operation on a video using only content from that video. For example, upon receiving video content including a sequence of initial frames, a computer generates a sequence of inputs corresponding to at least some of the sequence of initial frames and each input including, for example, a uniform noise map. The computer then generates a convolutional neural network (CNN) using the sequence of input as the initial layer. The parameters of the CNN are adjusted according to a cost function, which has components including a flow generation loss component and a consistency loss component. The CNN then outputs, on a final layer, estimated image values in a sequence of final frames.

19 Claims, 11 Drawing Sheets

(56) References Cited

OTHER PUBLICATIONS

Gupta, et al., "Characterizing and Improving Stability in Neural Style Transfer", In Proceedings of the IEEE Conference on Computer Vision and Pattern Recognition, arXiv:1705.03092v1, May 5, 2017, 10 pages.
Hays, et al., "Scene Completion Using Millions of Photographs", ACM Transactions on Graphics, 7 pages.
He, et al., "Image Completion Approaches using the Statistics of Similar Patches", IEEE Transactions on Pattern Analysis and Machine Intelligence,, pp. 2423-2435.
Heusel, et al., "GANs Trained by a Two Time-scale Update Rule Converge to a Local Nash Equilibrium", 31st Conference on Neural Information Processing Systems (NIPS), 2017, 12 pages.
Huang, et al., "Image Completion Using Planar Structure Guidance", ACM Transactions on Graphics, 10 pages.
Huang, et al., "Temporally Coherent Completion of Dynamic Video", ACM Transactions on Graphics, 11 pages.
Huang, et al., "Video Super-Resolution via Bidirectional Recurrent Convolutional Networks", Journal Of Latex Class Files, vol. 13, No. 9, Sep. 2014, 14 pages.
Iizuka, et al., "Globally and Locally Consistent Image Completion", ACM Transactions on Graphics, 14 pages.
Ji, et al., "Robust Video Denoising Using Low Rank Matrix Completion", In 2010 IEEE Conference on Computer Vision and Pattern Recognition (CVPR), Jun. 2010, 8 pages.
Jiang, et al., "Super SloMo: High Quality Estimation of Multiple Intermediate Frames for Video Interpolation", IEEE Conference on Computer Vision and Pattern Recognition (CVPR), arXiv:1712.00080v2, Jul. 13, 2018, 12 pages.
Johnson, et al., "Perceptual Losses for Real-Time Style Transfer and Super-Resolution", In European Conference on Computer Vision, Springer, arXiv:1603.08155v1, Mar. 27, 2016, 18 pages.
Kalantari, et al., "Improving Patch-Based Synthesis By Learning Patch Masks", IEEE International Conference on Computational Photography (ICCP), May 2014, pp. 1-8.
Kingma, et al., "A Method for Stochastic Optimization", pp. 1-15.
Komodakis, et al., "Image Completion Using Global Optimization", To Appeal in 2006 IEEE Computer Society Conference on Computer Vision and Pattern Recognition (CVPR'06), Jun. 2006, 8 pges.
Le, et al., "Motion-Consistent Video Inpainting", IEEE International Conference on Image Processing (ICIP), Sep. 2017, 6 pages.
Le Meur, et al., "Hierarchical Super-Resolution-Based Inpainting", IEEE Transactions on Image Processing, Oct. 2013, pp. 3779-3790.
Lecun, et al., "Efficient BackProp", Neural Networks: Tricks of the trade, 44 pages.
Ledig, et al., "Photo-Realistic Single Image Super-Resolution Using a Generative Adversarial Network", IEEE Conference on Computer Vision and Pattern Recognition (CVPR), arXiv:1609.04802v5, May 25, 2017,, 19 pages.
Lee, et al., "Laplacian Patch-Based Image Synthesis", IEEE Conference on Computer Vision and Pattern Recognition (CVPR), Jun. 2016, pp. 2727-2735.
Liu, et al., "Image Inpainting for Irregular Holes Using Partial Convolutions", The European Conference on Computer Vision (ECCV), Sep. 2018, 16 pages.
Nallabolu, "Unsupervised Learning of Spatiotemporal Features by Video Completion", PhD thesis, Virginia Tech, Jul. 10, 2017, 76 pages.
Newson, et al., "Video Inpainting of Complex Scenes", SIAM Journal on Imaging Sciences, Oct. 14, 2014, pp. 1993-2019.
Niklaus, et al., "Video Frame Interpolation via Adaptive Separable Convolution", IEEE International Conference on Computer Vision (ICCV), arXiv:1708.01692v1, Aug. 5, 2017, 10 pages.
Pathak, et al., "Context Encoders: Feature Learning by Inpainting", The IEEE Conference on Computer Vision and Pattern Recognition (CVPR), arXIv:1604.07379v2, Nov. 21, 2016, 12 pages.
Perazzi, et al., "A Benchmark Dataset and Evaluation Methodology for Video Object Segmentation", In Proceedings of the IEEE Conference on Computer Vision and Pattern Recognition, 2016, pp. 724-732.
Schocher, et al., ""Zero Shot" Super-Resolution using Deep Internal Learning", In Proceedings of the IEEE Computer Society Conference on Computer Vision and Pattern Recognition (CVPR), Jun. 2018, pp. 3118-3126.
Sun, et al., "Image Completion with Structure Propagation", ACM Transactions on Graphics, vol. 24, No. 3, Jul. 2005, 8 pages.
Sun, et al., "PWC-Net: CNNs for Optical Flow Using Pyramid, Warping, and Cost Volume", In Proceedings of the IEEE Conference on Computer Vision and Pattern Recognition, arXiv:1709.02371v3, Jun. 25, 2018, 18 pages.
Ulyanov, et al., "Deep Image Prior", The IEEE Conference on Computer Vision and Pattern Recognition (CVPR), Jun. 2018, 9 pages.
Wang, et al., "Image Quality Assessment: From Error Visibility to Structural Similarity", IEEE transactions on image processing, 14 pages.
Wang, et al., "Video Inpainting by Jointly Learning Temporal Structure and Spatial Details", arXiv:1806.08482v2, Dec. 3, 2018, 9 pages.
Wexler, et al., "Space-Time Video Completion", Proceedings of the IEEE Computer Society Conference on Computer Vision and Pattern Recognition (CVPR), Jun. 2004, 8 pages.
Xu, et al., "Image Inpainting by Patch Propagation Using Patch Sparsity", IEEE Transactions on Image Processing, pp. 1153-1165.
Yang, et al., "High-Resolution Image Inpainting using Multi-Scale Neural Patch Synthesis", IEEE Conference on Computer Vision and Pattern Recognition (CVPR), arXIv:1611.09969v2, Apr. 13, 2017, 9 pages.
Yu, et al., "Generative Image Inpainting with Contextual Attention", The IEEE Conference on Computer Vision and Pattern Recognition (CVPR), Jun. 2018, pp. 5505-5514.
Zhang, et al., "The Unreasonable Effectiveness of Deep Features as a Perceptual Metric", The IEEE Conference on Computer Vision and Pattern Recognition (CVPR), arXiv:1801.03924v2, Apr. 10, 2018, 14 pages.

* cited by examiner

VIDEO INPAINTING WITH DEEP INTERNAL LEARNING

TECHNICAL FIELD

This description relates to video editing, specifically video inpainting.

BACKGROUND

Inpainting is a process by which plausible visual content is synthesized within a missing region (e.g., hole). This may be done, for example, to remove unwanted objects in an image or a video. Nevertheless, inpainting a video is more difficult than inpainting a single image because, not only should content of the video be free of visual artifacts, but also the content should exhibit smooth motion (i.e., optical flow) between adjacent frames.

Some approaches to inpainting video content include training a neural network to fill in holes in a video. Conventional approaches to inpainting video content include learning inputs from an external image corpus via a deep neural network. That is, the resulting learned appearance model is applied to produce hallucinated content (i.e., plausible content added to a hole) conditioned upon known regions.

SUMMARY

In one general aspect, a method can include receiving, by processing circuitry of a computer configured to perform video inpainting, initial video data representing a sequence of initial frames. The method can also include generating, by the processing circuitry, a sequence of inputs, each of the sequence of inputs corresponding to a respective initial frame of the sequence of initial frames and having respective input values. The method can further include generating, by the processing circuitry, an untrained convolutional neural network (CNN) including an initial layer and a final layer, the initial layer of the plurality of layers including the values of each of the sequence of inputs. The method can further include performing, by the controlling circuitry, a training operation on the CNN to produce final video data including a sequence of final frames and a plurality of optical flows between each of the sequence of final frames in the final layer, each of the sequence of final frames corresponding to a respective initial frame of the sequence of initial frames and including estimated image values based on the plurality of optical flows. The method can further include rendering, by the controlling circuitry, the final video data on a display device, the final video data as rendered displaying an inpainted version of the initial video data on the display device.

The details of one or more implementations are set forth in the accompanying drawings and the description below. Other features will be apparent from the description and drawings, and from the claims.

DETAILED DESCRIPTION

Figure 1:
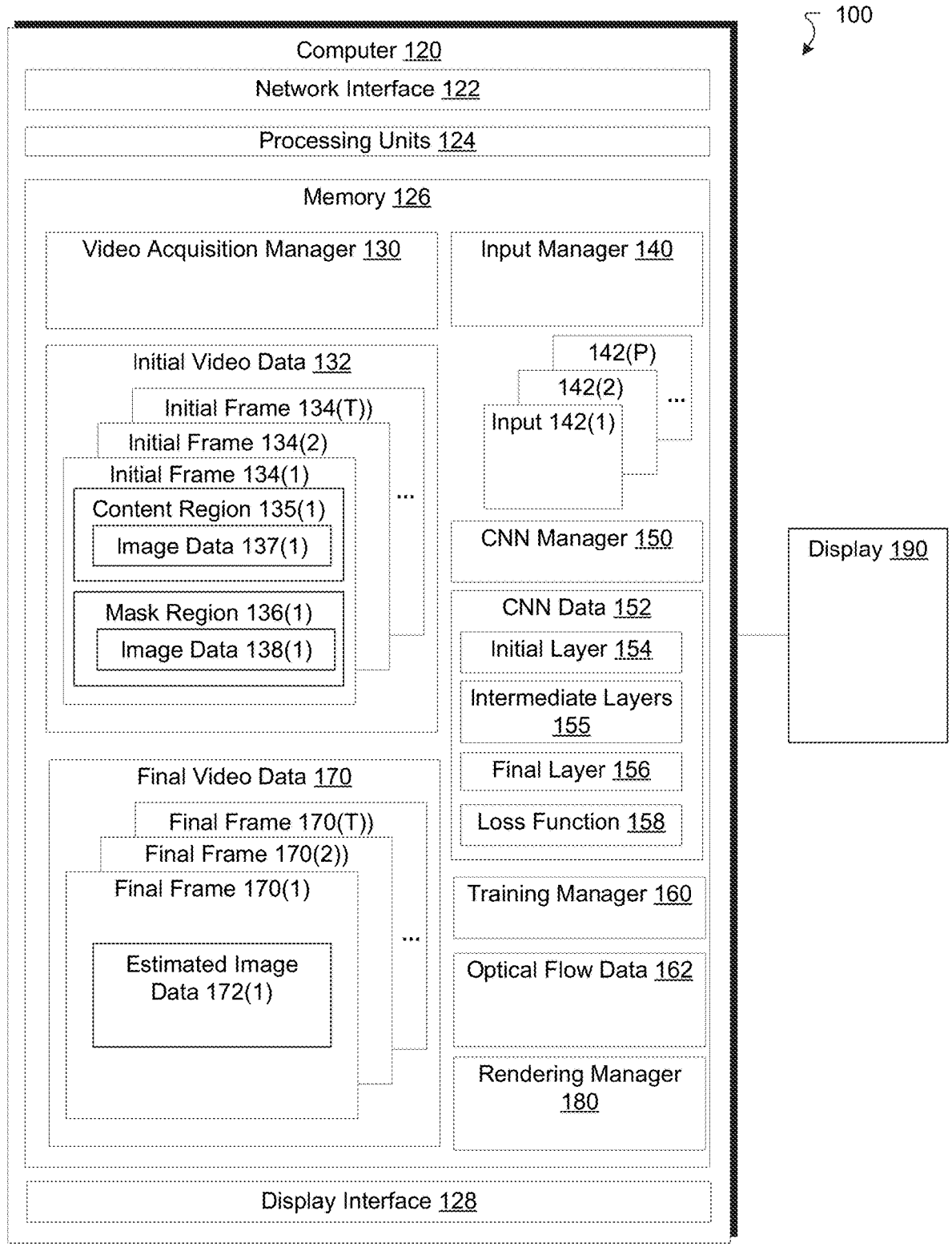
FIG. 1 is a diagram illustrating an example electronic environment in which improved techniques described herein may be implemented.

The discussion herein concerns an end-to-end video inpainting system that is part of a video editing and processing system. In a video editing and processing system, one decomposes a video into a sequence of frames, with each frame representing image values at an instant of time at each pixel. One may then perform transformations on each of the sequence of frames, either one at a time or in batches of multiple frames at once. An example of such a video and editing system is Adobe® Premier®.

An example of processing batches of frames is computing optical flows. An optical flow is used to track "objects" between pairs of frames. The optical flow may be forward or backward in time in that either the object motion is considered from an earlier frame in the sequence to a later frame, or a later frame in the sequence to an earlier frame.

Some video editing and processing systems may run a series of iterative operations on batches of frames. For example, certain models applied to image values of a batch of frames at a later instance of time depend on image values of some or all of the image values of the batch of frames at an earlier time. In such a situation, all of the frames of the video may be processed several times over. Each full run of a video in such an iterative process is an epoch. Video inpainting may require on the order of twenty epochs, as an example. In such a case, there may be multiple versions of the same frame, corresponding to different epochs.

When a video is split into batches as described above, an editing and processing system processes the frames of the video out of sequence. Accordingly, the system would place the frames of the video back in sequence before the processing is completed. One way to ensure that the frames are returned in sequence is to employ frame identifiers that do not change as the frame is processed. When there are multiple versions of the frames corresponding to different epochs, each epoch would also have an identifier, with the largest epoch to which a frame corresponds identifying a final version of the frame.

Image inpainting systems that perform image inpainting operations are used in image post-processing. The input into an image inpainting system is an image with a mask covering a region of the image; the output is an image in which the region covered by the mask is replaced with some other visually pleasing content.

Some approaches to image inpainting include patch-based approaches to fill large holes in natural images. In such approaches, image patches are sampled from a source image and then pasted into a region including large holes by minimizing a specified energy function. Nevertheless, such approaches rely on manually-designed metrics for low-level image features; such metrics are not effective enough for more complicated situations. In addition, these methods may fail when similar patches cannot be found from the source image.

Some image inpainting systems use deep neural networks to understand the high-level semantics of the image by training on large image datasets. In such systems, a learned model resulting from the training can be used to solve image inpainting problem with satisfying results. One approach uses partial convolution, where the convolution is masked and renormalized to be conditioned only on valid pixels (Liu, G., Reda, F. A., Shih, K. J., Wang, T. C., Tao, A. and Catanzaro, B., 2018. Image inpainting for irregular holes using partial convolutions. arXiv preprint arXiv: 1804.07723). Another approach includes a contextual attention layer to attend useful feature patches at distant locations and make use of generative adversarial networks (GAN) to improve the inpainting quality (Yu, J., Lin, Z., Yang, J., Shen, X., Lu, X. and Huang, T. S., 2018. Generative image inpainting with contextual attention. arXiv preprint). While both of these approaches have achieved visually impressive image inpainting results, they cannot be directly applied to the problem of video inpainting.

Although the problem of image inpainting has been well-studied, the problem of video inpainting is relatively under-explored. The problem of video inpainting may be extended from that of image inpainting. The input into a video inpainting system that performs video inpainting operations is a sequence of video frames with a sequence of masks, each of the sequence of masks covering a respective region of a respective frame. Nevertheless, simply applying the above-described image inpainting operation in the video inpainting operation, frame by frame, will not produce satisfying results because of the unique challenge of temporal consistency in video inpainting.

The challenge of achieving temporal consistency in video inpainting can be grouped into two types: content consistency and motion consistency. Content consistency requires the video inpainting operation to fill the mask region of a frame with the content seen in other frames, rather than introducing entirely new content not seen in the other frames. Motion consistency requires the video inpainting operation to produce smooth results between neighboring frames without flickering artifacts. The above-described conventional approaches to video inpainting address the challenge of temporal consistency by considering content consistency and motion consistency separately, with content consistency being considered using external video data (i.e., video data other than the video data on which the video inpainting system operates).

A further approach extends the above-described patch-based optimization approach by incorporating texture features and using a spatial-temporal version of the patching algorithms. Another approach jointly estimates optical flow and color in regions including large holes. However, these approaches are performed at the raw pixel level rather than at a more efficient, global level.

Nevertheless, the above-described conventional approaches to inpainting video content require an unreasonably large amount of external video data, as it is difficult to train a single model on such an external dataset to learn effective inputs for video in general. Accordingly, learning from such an external dataset makes it difficult to maintain content consistency over an entire video.

To enable video inpainting results with content consistency, a deep internal learning framework for video inpainting is presented herein. Some such frameworks fit a deep convolutional neural network (CNN) model to each input video to effectively re-parameterize the video data using the CNN model. Such a self-learning strategy enables the CNN model to make use of internal visual statistics specific to each input video to handle content consistency over a long time scale (i.e., many frames). This framework further enables motion consistency by performing inpainting jointly in both visual domain and motion domain.

Thus, in accordance with the implementations described herein and in contrast to the above-described conventional approaches to inpainting video content, improved techniques of inpainting video content include generating a neural network to perform an inpainting operation on a video using only content from that video. For example, upon receiving video content including a sequence of initial frames, a computer generates a sequence of inputs corresponding to at least some of the sequence of initial frames and each input including, for example, a uniform noise map. The computer then generates a CNN using the sequence of inputs as the initial layer of the CNN. The parameters of the CNN are adjusted according to a cost function, which has components including a flow generation loss component and a consistency loss component. The CNN then outputs, on a final layer, estimated image values in a sequence of final frames.

The above-described improved techniques of video inpainting are inspired by a single image inpainting technique, Deep Image Prior (DIP) (Ulyanov, D., Vedaldi, A. and Lempitsky, V, 2018. Deep image prior. In Proceedings of the IEEE International Conference on Computer Vision and Pattern Recognition). DIP re-parameterizes an image using a CNN and, in doing so, demonstrates that a generator network is sufficient to capture low-level image statistics prior to any training on external dataset, which can be used to solve problems like image inpainting and super resolution. The above-described improved techniques of video inpainting extend this framework from single image to video by utilizing more and different cost functions. Such cost functions demonstrate that our model can capture spatial-temporal information inside an input video.

Compared to the above-described patch-based synthesis model, the above-described improved techniques include network-based synthesis, which is more robust to cases such as distortion and inter-frame lighting/color variation. In network-based synthesis, matching, copying and pasting is completed explicitly by the CNN model instead of being manually designed on image pixel level in the patch-based methods. Experiments demonstrate that defining consistency loss using optical flow encourages the CNN model to make use of spatial-temporal information to perform inpainting with satisfactory results. The CNN model used herein is specifically optimized on the input video and accordingly outperforms, in maintaining content consistency, other learning-based approaches that use external datasets.

To summarize, the improved techniques described above use only the content of the video itself in order to be inpainted and do not require any external video data. The inputs input into the CNN used for the inpainting may be produced from simply randomly generated data (e.g., a uniform random distribution, gaussian white noise, and the like). The image values in a mask region of the initial frames may be estimated and/or transformed based on computed optical flows between pairs of initial frames. The image data in a resulting sequence of final frames has been shown to be at least as accurate as that resulting from the conventional techniques.

The value of performing video inpainting according to the improved techniques lies in video editing. Because the improved techniques of video inpainting require no external data to generate a CNN, the experience of video editing is less burdensome. For example, the above-described conventional approaches to inpainting video content require training operations on the external data in order to produce the value of the weights of the hidden nodes from which the output inpainted frames may be determined. Such training operations require a large amount of resources and time to perform. In contrast, the improved techniques described herein require no such training operations prior to determining the inpainted frames. Rather, the training operation stands in as a model for performing a direct computation on input frames that produces the inpainted frames as a natural result of minimizing the cost function.

Moreover, the improved techniques do not make use of a CNN in a traditional manner. In conventional approaches to inpainting which involve building a CNN model, one performs training on external datasets to build the model (e.g., define CNN parameters on defined intermediate layers), and then the CNN model may be used in a predictive manner to determine the inpainted frames. In contrast, the improved techniques involve using the training framework to perform the inpainting function directly. That is, no external datasets are used; instead, from random inputs, a CNN that minimizes the cost function appropriate to the video sequence in question directly produces the inpainted frames. Once the final, inpainted frames are produced, the CNN model is not used for anything else. A new video sequence would require the generation of a whole new CNN.

The following non-limiting definitions will be used herein. An optical flow is a vector field over the two-dimensional space of a pair of frames of a sequence of frames of a video, each element of the vector field representing a motion of a pixel having a fixed brightness between the pair of frames. A noise map is an image with brightness values over the two-dimensional space of a frame that are randomly distributed. Target image values of a frame or sequence of frames are image values (i.e., brightness values for a pixel) over frames in the sequence of frames of a video that are known and are to be compared with estimated image values generated by the improved techniques.

FIG. 1 is a diagram that illustrates an example electronic environment 100 in which the above-described improved techniques may be implemented. As shown, in FIG. 1, the electronic environment 100 includes a computer 120 and a display 190.

The computer 120 is configured to display user-specified drawings on a display device. The computer 120 includes a network interface 122, one or more processing units 124, memory 126, and a display interface 128. The network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like.

The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a video acquisition manager 130, an input manager 140, a CNN manager 150, a training manager 160, and a rendering manager 180. Further, as illustrated in FIG. 1, the memory 126 is configured to store various data, which is described with respect to the respective managers that use such data.

The video acquisition manager 130 is configured to obtain initial video data 132 representing a video that may be displayed on the display device 190. In some implementations, the video acquisition manager 130 is configured to receive the initial video data 132 over a network vis the network interface 122. In some implementations, the video acquisition manager 130 is configured to receive the initial video data 132 via local storage (e.g., memory 126).

The initial video data 132 represents a video that may be rendered (e.g., by the rendering manager 180) onto a display (e.g., display 190) for viewing by a user. The initial video data 132 represents multiple of images, or frames, that are ordered sequentially in time. Each of the sequence of frames is an image including multiple pixels (e.g., 640×480), such that each pixel includes an image value (e.g., grayscale value, RGB value). In some implementations, the initial video data has a frame rate of at least 24 frames per second (fps) (e.g., 30 fps, 60 fps, 120 fps, or higher). In some implementations, the initial video data 132 is encoded in a H.264 format. In some implementations, the initial video data 132 is encoded in a MPEG-4 format. In some implementations, another the initial video data 132 is encoded in another known format.

At least one of the sequence of frames has a mask region in which there is unwanted content (or pixels) that is to be removed and replaced with content that is most likely the content obscured by the unwanted content. That content in a frame defines a region of the frame which herein is called a mask region. The rest of the frame, in which the content is to be maintained as much as possible, is herein called a content region. As shown in FIG. 1, the initial video data 132 includes a sequence of initial frames 134(1), 134(2), . . . , 134(T), where T is the number of frames of the sequence of initial frames 134(1), 134(2), . . . , 134(T).

Each of the sequence of initial frames 134(1), 134(2), . . . , 134(T) represents an image containing a rectangular array of pixels according to a set resolution. As described above, each of the pixels includes a value or values that describe an attribute. In some implementations, the attribute is a brightness and the value is an integer grayscale value between 0 and 255, for example. In some implementations, the attribute is color and the value is a triplet representing an RGB value, each value of the triplet being an integer between 0 and 255, for example. As also described above, each of the sequence of initial frames 134(1), 134(2), . . . , 134(T) includes a respective content region, e.g., 135(1) and mask region, e.g., 136(1).

The content region 135(1) of the initial frame 134(1), as described above, contains image data 137(1) representing pixels, or image values constant over small rectangular regions. In some implementations, the image data 137(1) represents image values that are scalar and represent a brightness such as a grayscale value. In some implementations, the image data 137(1) represents image values that are vector and represent a color, for example RGB triplets. As described above, the image data 137(1) is stored in a file format (e.g., from a codec). Also as described above, the image data 137(1) in the content region 135(1) should be maintained as much as possible by the CNN during training. Accordingly, the image data 137(1) represents target image values with which the results of an inpainting operation is to be compared.

The mask region 136(1) of the initial frame 134(1), as described above, contains image data 138(1) different from the image data 137(1) in the content region 135(1). In some implementations, the mask region 136(1) has a boundary that takes the form of a closed curve (or a stairstep curve in the presence of a finite number of pixels), across which there are large discontinuities in image values. In some implementations, the image values represented by the image data 138(1) are all zero. In some implementations, the image data 137(1) and the image data 138(1), taken as an aggregate over the initial frame 134(1), are represented as a single image profile $I_i$ modified by a binary mask function $M_i$. In such an implementation, the binary mask function $M_i$ has the value of unity in the content region 135(1) and zero in the mask region 137(1). This implementation is considered herein.

A result of a video inpainting operation on the initial video data 132 is to generate image values in each of a sequence of final frames that result in visually plausible content that is coherent in both space (i.e., over each frame) and time (i.e., across different frames). Inputs play a role in expressing such a constraint.

The input manager 140 is configured to generate a sequence of inputs 142(1), 142(2), . . . , 142(P), where P is the number of inputs of the sequence of inputs 142(1), 142(2), . . . , 142(P). Each of the sequence of inputs, e.g., input 142(1) includes input values that are input into an untrained CNN. A remarkable fact about the improved techniques described herein are that the results in the final frame may be derived from an almost arbitrary sequence of inputs. In some implementations, the input manager generates the sequence of inputs 142(1), 142(2), . . . , 142(P) from a noise map $\{N_i\}_{i=1...P}$. In some implementations, the noise map is based on uniformly distributed random values. In some implementations, the noise map is based on non-uniformly distributed random values (e.g., gaussian white noise). In some implementations, the input manager 140 generates the noise maps for each of the sequence of inputs 142(1), 142(2), . . . , 142(P) independently from one another.

The CNN manager 150 is configured to generate an untrained CNN model (e.g., CNN data 152) $G_\theta$, where $\theta$ represents the parameters of the CNN. The parameters of the CNN include weights for each node at each layer. The CNN manager 150 selects, as the input, at least one of the sequence of inputs 142(1), 142(2), . . . , 142(P). The CNN manager 150 also generates, as part of the CNN data 152, intermediate layers 155 and a final layer 156; the final layer 156 will contain the values of the image data of final frames (e.g., final frame 170(1)).

As shown in FIG. 1, the CNN data 152 also includes data representing a loss function 158. The loss function 158 is an expression that is minimized as part of a training of the CNN model $G_\theta$. The minimization of the loss function 158 is over the CNN parameters $\theta$; this minimization results in adjustment of weights of nodes at each layer of the CNN. Further details of the loss function 158 are discussed with regard to FIG. 4.

The training manager 160 is configured to perform a training operation on the CNN model $G_\theta$ to produce parameter values $\theta^*$ and, ultimately, estimated image data 172(1) of final frame 170(1), and so on for the sequence of final frames 170(1), 170(2), . . . , 170(T). For example, the training manager 160 adjusts the parameters $\theta$ such that estimated image data 172(1), . . . of the sequence of final frames 170(1), . . . and the estimated optical flows 162 minimize the loss function 158.

The rendering manager 180 is configured to render the final video data 170 to display the rendered final video data on the display 190. In some implementations, when the final video data 170 is encoded (e.g., with a H.264 codec), the rendering manager 180 decodes the encoded data.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, a video acquisition manager 130 (and/or a portion thereof), an input manager 140 (and/or a portion thereof), a CNN manager 150 (and/or a portion thereof), a training manager 160 (and/or a portion thereof), and a rendering manager 180 (and/or a portion thereof can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including initial video data 132, input data 142, CNN data 152, optical flow data 162, and final video data 170.

Figure 2:
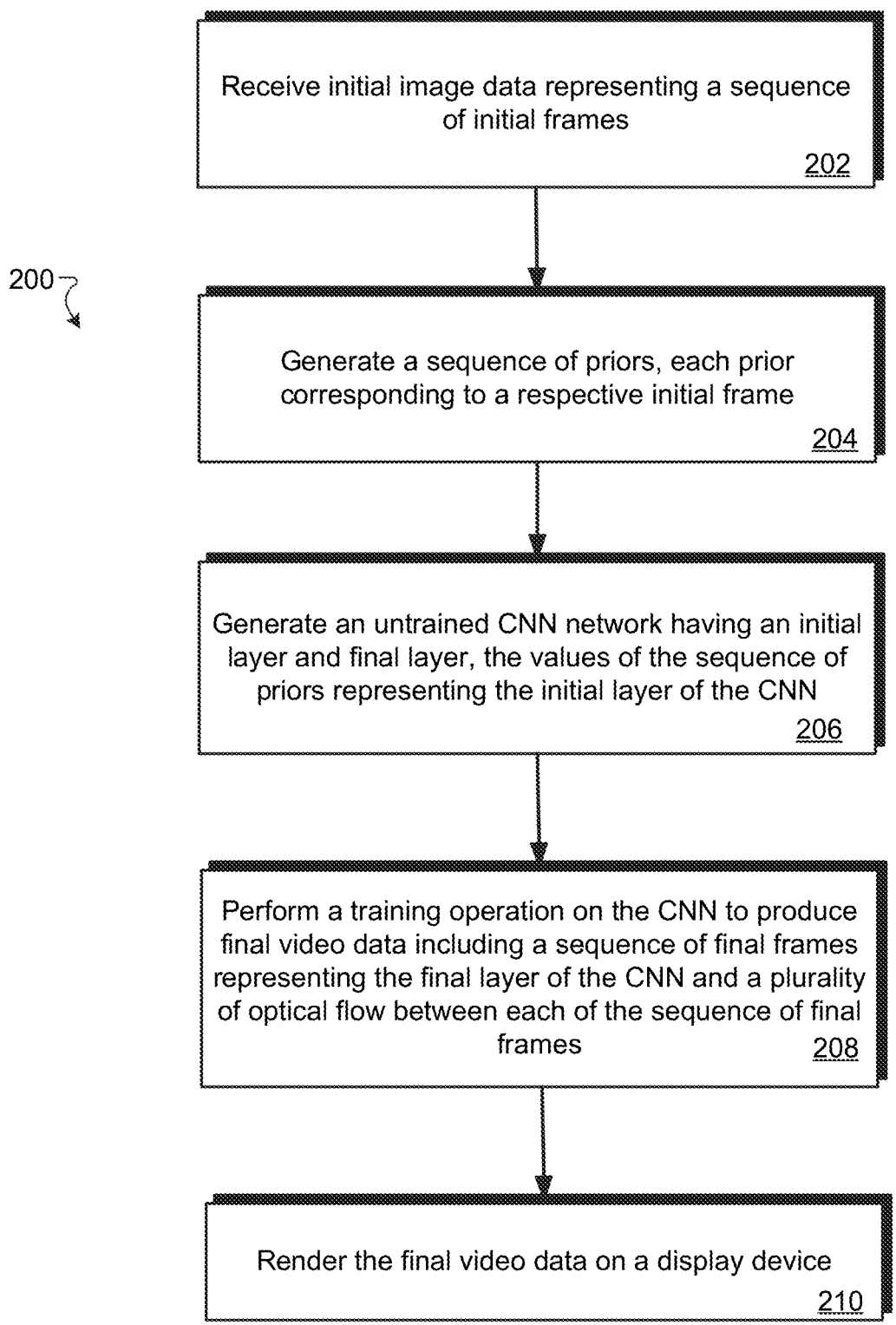
FIG. 2 is a flow chart illustrating an example method of implementing the improved techniques as shown in the electronic environment in FIG. 1.

FIG. 2 is a flow chart depicting an example method 200 of displaying drawings on a display device. The method 200 may be performed by software constructs described in connection with FIG. 1, which reside in memory 126 of the computer 120 and are run by the set of processing units 124.

At 202, the video acquisition manager 130 receives initial video data (e.g., initial video data 132) representing a sequence of initial frames (e.g., initial frames 134(1), 134(2), . . . , 134(T)), each of the sequence of initial frames including a content region (e.g., content region 135(1) of initial frame 134(1)) and a mask region (e.g., mask region 136(1) of initial frame 134(1)), the content region including target image values (e.g., image data 137(1)), the mask region including image values (e.g., image data 138(1)) different from the target image values.

At 204, the input manager 140 generates a sequence of inputs (e.g., inputs 142(1), . . . ,142(P)), each of the sequence of inputs corresponding to a respective initial frame of the sequence of initial frames and having respective input values.

At 206, the CNN manager 150 generates an untrained CNN (e.g., CNN data 152) including an initial layer (e.g., initial layer 154) and a final layer (e.g., final layer 156), the initial layer of the plurality of layers including the values of each of the sequence of inputs.

At 208, the training manager 160 performs a training operation on the CNN to produce final video data (e.g., final video data 170) including a sequence of final frames (e.g., sequence of final frames 172(1), . . . , 172(T)) and a plurality of optical flows (e.g., optical flows 162) between each of the sequence of final frames in the final layer, each of the sequence of final frames corresponding to a respective initial frame of the sequence of initial frames and including estimated image values based on the plurality of optical flows.

At 210, the rendering manager 180 renders the final video data on a display device, the final video data as rendered displaying an inpainted version of the initial video data on the display device (e.g., display 190).

Figure 3:
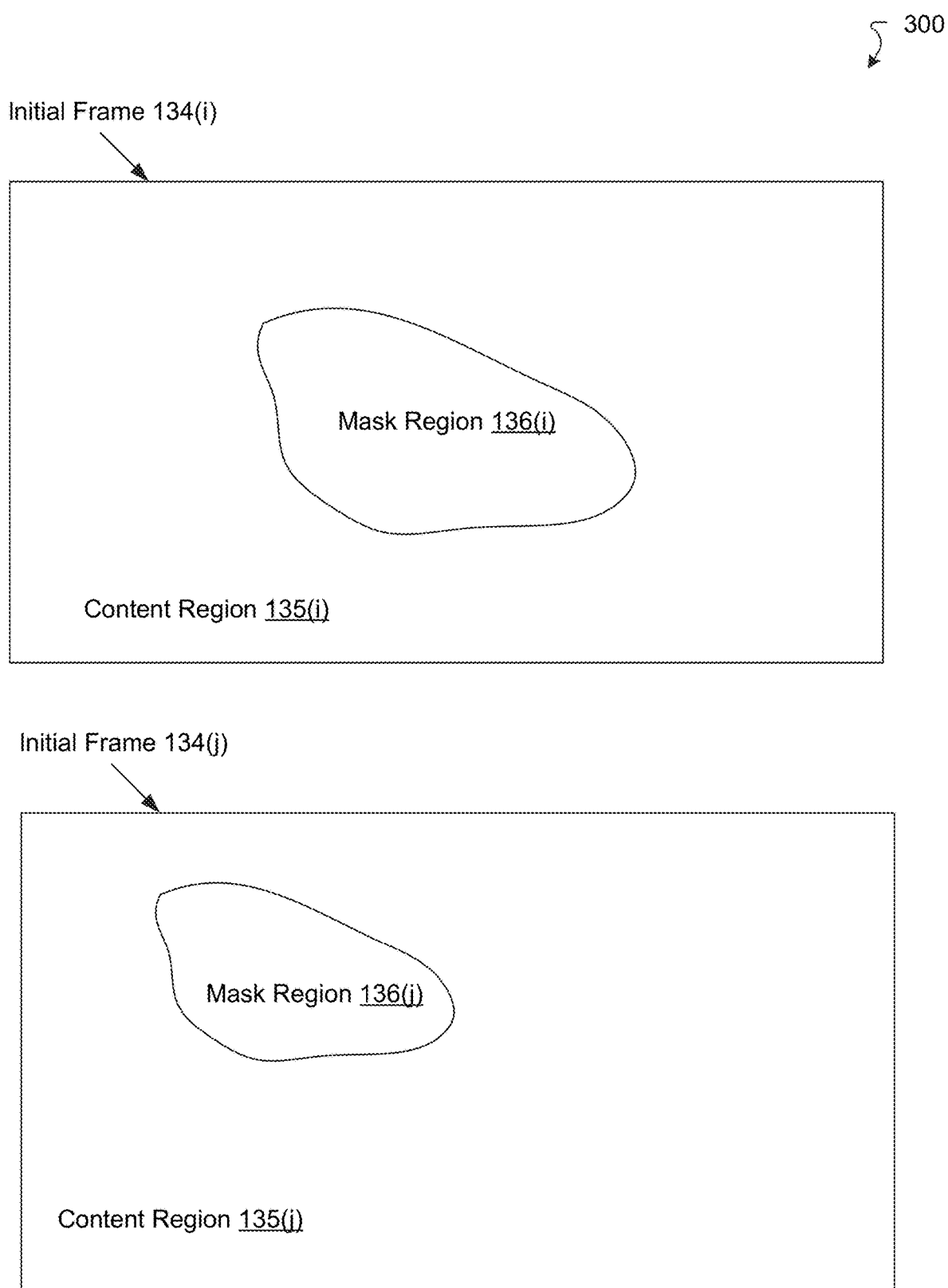
FIG. 3 is a diagram illustrating an example pair of frames and their respective mask regions.

FIG. 3 is a diagram illustrating an example pair of initial frames 300 and their respective mask regions. The first initial frame 134($i$) has a content region 135($i$) and a mask region 136($i$). The mask region 136($i$) is bounded by a closed curve, although as discussed above, the closed curve is, in reality, a stairstepped curve because of the finite amount of pixels in the first initial frame 134($i$). Similarly, the second initial frame 134($j$) has a content region 135($j$) and a mask region 136($j$) which is bounded by a (stairstepped) closed curve.

As shown in FIG. 3, the mask regions 136($i$) and 136($j$) are not aligned because, ostensibly, the object represented by the mask regions 136($i$) and 136($j$) move over time. Such movement illustrates the difficulty of performing video inpainting such that the resulting sequence of final frames has a consistency and continuous flow. The loss function (e.g., the loss function 158 in FIG. 1) defined herein will reflect the goal of having consistency and continuous flow in the sequence of final frames. Such a loss function is discussed in detail with regard to FIG. 4.

Figure 4:
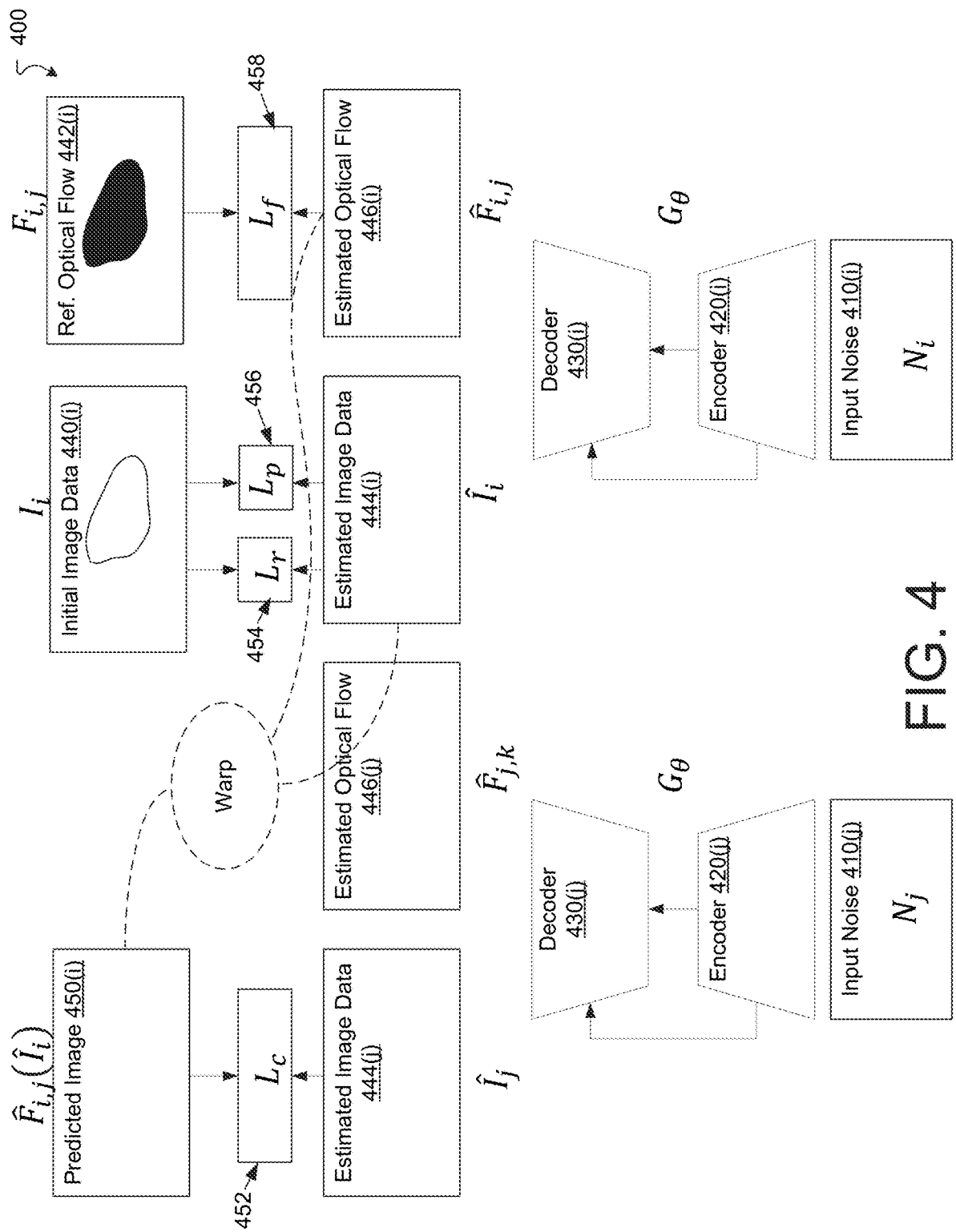
FIG. 4 is a diagram illustrating an example architecture of a CNN-based video inpainting process.

FIG. 4 is a diagram illustrating an example framework 400 of a CNN-based video inpainting process. As shown in FIG. 4, the framework 400 includes inputs corresponding to two frames of the initial sequence of frames 134($i$) and 134($j$). The inputs to the CNN corresponding to those frames are input noise 410($i$) and input noise 410($j$), respectively.

Each of the input noise 410($i$) and 410($j$) are included in an initial layer of the CNN model $G_\theta$. As shown in FIG. 4, the CNN is implemented as an encoder-decoder architecture with skip connections. (The skip connections are denoted in FIG. 4 as the arrows on the sides of the encoders 420($i$) and 420($j$) and decoders 430($i$) and 430($j$).) In some implementations, the CNN includes a specified number of convolution blocks in each the encoders 420($i$) and 420($j$) and decoders 430($i$) and 430($j$). In some implementations, there are six convolution blocks in each the encoders 420($i$) and 420($j$) and decoders 430($i$) and 430($j$). In some implementations, each convolution block includes two convolution layers with stride 2 and stride 1, followed by a LeakyReLU activation. The CNN also includes image and flow generation branches for generating the estimated image values and the optical flows; these branches share the convolution blocks and separate at a final 1×1 convolution layer. The output of the flow branch includes twelve channels corresponding to six flow map transformations including the forward and backward flows at strides of 1, 3, and 5. These strides are discussed in further detail with regard to FIG. 5.

The output of the CNN from decoder 430($i$) includes a final frame i having estimated image data 444($i$) (denoted as $\hat{I}_i$) and estimated optical flow 446($i$) (denoted as $F_{i,j}$). The output of the CNN from decoder 430($j$) includes a final frame j having estimated image data 444($j$) (denoted as $\hat{I}_j$) and estimated optical flow 446($j$) (denoted as $F_{j,k}$). These outputs are then input into a cost function L, which is explained in further detail.

As shown in FIG. 4, the loss function L takes the following form:

$$L=\omega_r L_r+\omega_c L_c+\omega_f L_f+\omega_p L_p,$$

where $L_r$ is an image generation loss 454, $L_f$ is a flow generation loss 458, $L_c$ is a consistency loss 452, and $L_p$ is a perceptual loss 456. The corresponding ω's are weights specified by a user.

Mathematically, the image generation loss may be expressed as follows:

$$L_r = \sum_{i=1}^{T} \left\| M_i \odot (\hat{I}_i - I_i) \right\|_2^2,$$

where $I_i$ is the target image in the $i^{th}$ initial frame 440($i$), $M_i$ is the binary mask function defining the mask region of the $i^{th}$ initial frame, and $\odot$ is the Hadamard product operator. It is noted that only the image values in the content region of each of the initial frames are used in this component of the loss function.

While the image generation loss alone is useful in training video when the mask regions of the sequence of initial frames are small, it has problems dealing with large mask regions, e.g., at least 20% of the total area of the image. Pixels too far from the mask region boundaries are highly under-constrained and tend to generate unnatural patterns. Also, while the CNN can learn from the content regions of the sequence of initial frames to capture image structures, the CNN does not capture any relations between the same information appearing across different frames and does not generate content that are consistent with the content regions of other frames. Accordingly, the other components of the loss function are used to recover such content.

In some implementations, to treat the large mask regions and temporal consistency in video inpainting, information is allowed to be propagated between frames. Accordingly, the loss function has additional components to learn such information propagation during the training of the CNN. To this effect, the CNN is augmented so that the output of the CNN is given by $G_\theta(N_i)=\hat{I}_i, \hat{F}_{i,j}$ as illustrated in FIG. 4.

The flow generation loss function is expressed as follows:

$$L_c(\hat{F}_{i,j}) = \|O_{i,j} \odot M_{i,j}^f \odot (\hat{F}_{i,j} - F_{i,j})\|_2^2.$$

Here, $F_{i,j}$ is a reference optical flow 442(j) between frames i and j of the sequence of initial frames and $\hat{F}_{i,j}$ is the estimated optical flow between frames i and j of the sequence of final frames. In some implementations, the reference optical flow $F_{i,j}$ is estimated using PWC-Net with the frames i and j of the sequence of initial frames. In such an implementation, PWC-Net also returns an occlusion map $O_{i,j}$ through a forward-backward consistency check.

The quantity $M_{i,j}^f = M_i \cap F_{i,j}(M_j)$ represents the reliable flow region between frames i and j of the sequence of initial frames. The quantity $F_{i,j}(M_j)$ represents a warped mask from frame j of the sequence of initial frames, the warping of the mask $M_j$ being performed by the reference optical flow between frames i and j of the sequence of initial frames.

The CNN, using the image generation loss and the flow generation loss defined above, jointly estimates image values and optical flows in the sequence of final frames, there is also a need to have the CNN account for flow-image consistency loss between frames to encourage the optical flows of pairs of frames and the image values of frames of the sequence of final frames to constrain each other. To this effect, the consistency loss is defined as follows.

$$L_c(\hat{I}_i, \hat{F}_{i,j}) = \|(1 - M_{i,j}^f) \odot (\hat{F}_{i,j}(\hat{I}_j) - \hat{I}_i)\|_2^2,$$

where $\hat{F}_{i,j}(\hat{I}_j)$ denotes a warped version of the estimated image values of frame j of the sequence of final frames according to the estimated optical flow $\hat{F}_{i,j}$ using a backward warping. This warping is shown in FIG. 4, in which the estimated image data 444(j) and the estimated optical flow 446(j) are combined via the backward warping to produce the transformed image 450(j).

The consistency loss may use the complement of the reliable flow region between frames i and j of the sequence of initial frames. Accordingly, the consistency loss may be evaluated only in the mask regions of these frames. This loss component addresses large mask regions.

In some implementations, the optical flow transformations in forward and backward directions are evaluated for those frames for which $j \in \{i \pm 1, i \pm 3, i \pm 5\}$. That is, the spacings between the pairs of frames used in estimating optical flows are one, three, and five frames.

The final component of the loss function is a perceptual loss, which is defined according to a similarity of extracted feature maps from a pre-trained deep CNN model developed by the Visual Geometry Group (VGG network). The perceptual loss is defined as follows.

$$L_p(\hat{I}_i) = \sum_{j \in J} \left\| M_i \odot (\phi_j(\hat{I}_i) - \phi_j(I_i)) \right\|_2^2,$$

where $\phi_j(I_i)$ denotes a feature extracted from $I_i$ using the $j^{th}$ layer of a pre-trained VGG network, and J represents the set of layers of the pre-trained VGG network.

The weights $\omega_r, \omega_f, \omega_c,$ and $\omega_p$ are, in some implementations, received from a user performing the video inpainting. In some implementations, the values of the weights are $\omega_r=1, \omega_f=0.1, \omega_c=1,$ and $\omega_p=0.01$.

The framework 400 defines the quantities needed to compute the loss function that trains the CNN used for video inpainting. Details of an example implementation of the framework 400 are discussed with regard to FIGS. 5-7.

Figure 5:
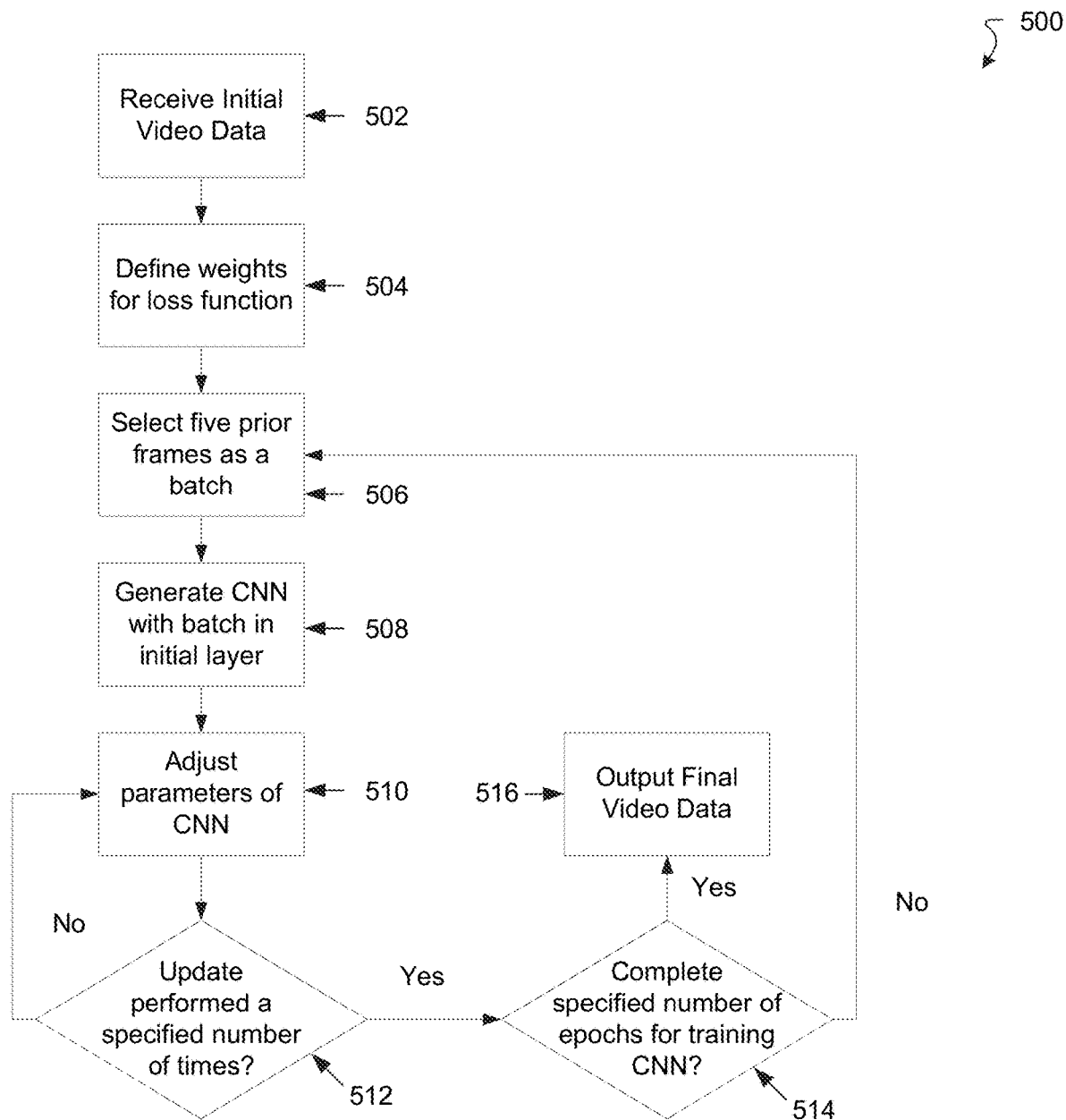
FIG. 5 is a flow chart illustrating an example implementation of a CNN-based video-inpainting process.

FIG. 5 is a flow chart illustrating an example procedure 500 used to perform a training of the CNN to produce a sequence of final frames (e.g., sequence of final frames 170(1), . . . , 170(T)) from a sequence of initial frames (e.g., sequence of initial frames 134(1), . . . , 134(T)). The procedure 500 may be performed by software constructs described in connection with FIG. 1, which reside in memory 126 of the computer 120 and are run by the set of processing units 124.

At 502, the video acquisition manager 130 receives initial video data 132 as described above.

At 504, the CNN manager 150 defines weights for the loss function 158.

In some implementations, the weights are received from a user as described above.

At 506, the input manager 140 randomly selects five frames to which a plurality of inputs corresponds. As described above, the five frames may be spaced in time by a specified amount, e.g., 1, 3, and 5 frames apart. The inputs corresponding to these frames form a batch of frames.

At 508, the CNN manager 150 generates the untrained CNN such that the inputs are input as the initial layer of the CNN.

At 510, the training manager 160 propagates the image values and the optical flows across intermediate layers (e.g., intermediate layers 155) of the CNN to the final layer. The training manager then evaluates the loss function (e.g., loss function 158) at the final layer as part of a minimization of the loss function. The minimization operation involves adjusting the parameters θ of the CNN until the minimum value of the loss function has been attained. In some implementations, the training manager 160 adjusts the parameters θ of the CNN using a back-propagation with gradients obtained from the loss function L defined above, the loss function L being computed from the batch of frames. In some implementations, the adjustment of the parameters θ of the CNN is performed over a specified number of epochs (i.e., one epoch corresponds to a full pass through a video). In some implementations, the number of epochs over which the adjustment of the parameters θ of the CNN is performed is 20. It is noted that there are multiple versions of the same frame over the different epochs.

At 512, the training manager 160 determines whether the adjustment of the parameters of the CNN has been performed a specified number of times. In some implementations, the parameter adjustment is performed between 50 and 100 times. If the adjustment has been performed at least 100 times, then the procedure 500 may continue. If not, then the procedure 500 returns to adjust the CNN parameters at 510.

At 514, the training manager 160 determines whether the specified number of epochs have been completed. Again, an epoch corresponds to a full pass through the acquired video. In some implementations, the training manager 160 trains (i.e., performs parameter updates for) the CNN for 20 epochs. If the specified number of epochs have been completed, then the procedure 500 may continue. If not, then the procedure 500 returns to select a new batch of frames at 506.

At 516, the rendering manager 180 outputs the sequence of final frames in the display 190.

Figure 6:
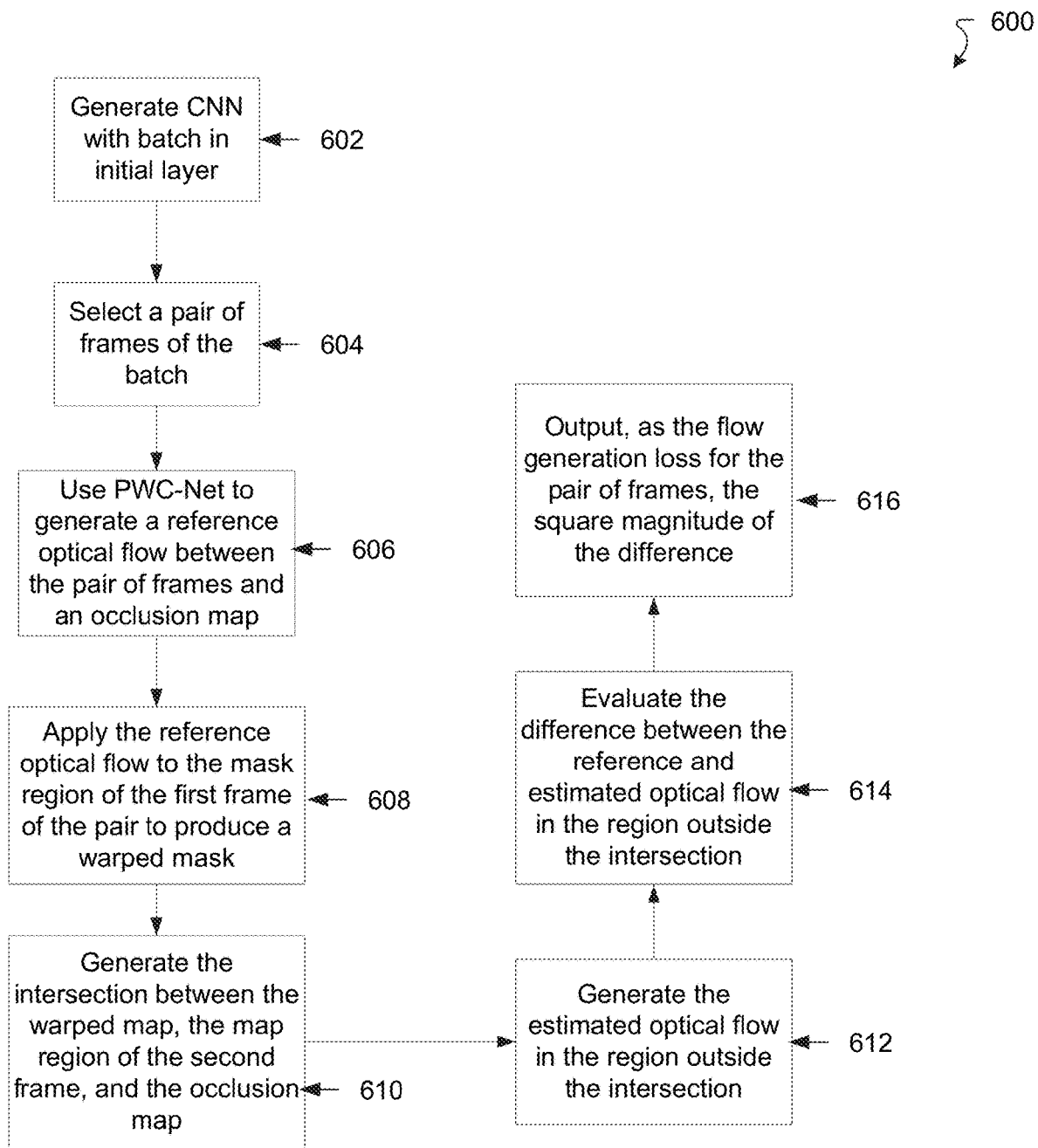
FIG. 6 is a flow chart illustrating example process of generating a flow generation loss component of a loss function in a CNN-based video inpainting process.

FIG. 6 is a flow chart illustrating example process 600 of generating a flow generation loss component of a loss function in a CNN-based video inpainting process. The procedure 600 may be performed by software constructs described in connection with FIG. 1, which reside in memory 126 of the computer 120 and are run by the set of processing units 124.

At 602, the CNN manager 150 generates the untrained CNN.

At 604, the training manager 160 selects a pair of frames i and j from a batch.

At 606, the training manager 160 generates a reference optical flow $F_{i,j}$ between the pair of frames and an occlusion map $O_{i,j}$.

At 608, the training manager 160 applies the reference optical flow to frame j to produce a warped mask $F_{i,j}(M_j)$.

At 610, the training manager 160 generates an intersection between the warped mask $M_j$, the mask region of frame i, and the occlusion map.

At 612, the training manager 160 generates the estimated optical flow $\hat{F}_{i,j}$ in the region outside of the intersection.

At 614, the training manager 160 evaluates the difference between the reference and estimated optical flows in the region outside of the intersection.

At 616, the training manager outputs, as the flow generation loss for the pair of frames, the square magnitude of the difference.

Figure 7:
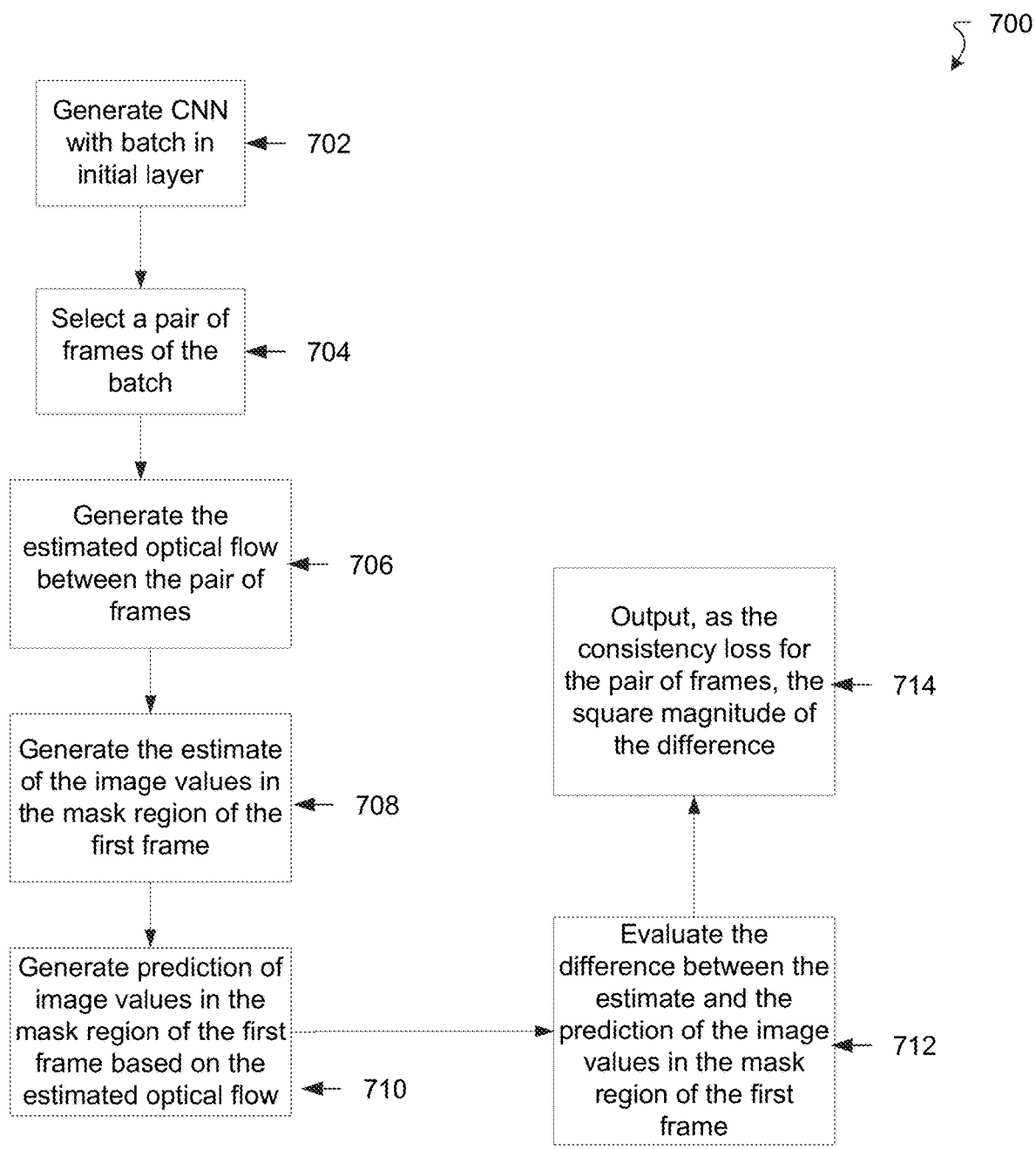
FIG. 7 is a flow chart illustrating an example process of generating a consistency loss component of a loss function in a CNN-based video inpainting process.

FIG. 7 is a flow chart illustrating example process 700 of generating a consistency loss component of a loss function in a CNN-based video inpainting process. The procedure 700 may be performed by software constructs described in connection with FIG. 1, which reside in memory 126 of the computer 120 and are run by the set of processing units 124.

At 702, the CNN manager 150 generates the untrained CNN

At 704, the training manager 160 selects a pair of frames i and j from a batch.

At 706, the training manager 160 generates an estimated optical flow $\hat{F}_{i,j}$ between the pair of frames.

At 708, the training manager 160 generates an estimate of the image values $\hat{I}_i$ in the mask region of the frame i.

At 710, the training manager 160 generates a transformation of the image values $\hat{F}_{i,j}(\hat{I}_j)$ in the mask region of the frame i based on the estimated optical flow.

At 712, the training manager 160 evaluates the difference between the estimate of the image values and the transformation of the image values in the mask region of the frame i.

At 714, the training manager 160 outputs, as the consistency loss, the square magnitude of the difference.

Results of applying the above-described video inpainting operation to video data, and comparisons with conventional techniques, are discussed below with regard to FIGS. 8A-8D. Here, the above-described video inpainting operation is applied to two sources of videos. The operation is applied to a DAVIS video segmentation benchmark that includes videos with frame-wise object segmentation masks. DAVIS videos, however, do not have a "ground-truth" background with objects in the mask region removed. Accordingly, another dataset may be used in which each video has both foreground masks indicating the mask regions and the ground-truth background frames. 20 background videos were obtained and 60 consecutive frames of each video were randomly selected. Each video may be composed with five object mask sequences randomly selected from DAVIS. In total, the video dataset includes 100 video clips with real video background and real object masks.

The following variants are used in evaluating the conventional and above-described improved techniques:

DIP: applies Deep Image Input to video in a frame-by-frame manner.

DIP-Vid: applies the framework 400 but uses only the image generation loss component of the loss function.

DIP-Vid-3DCN: applies the framework 400 but using a 3D CNN using only the image generation loss component of the loss function.

DIP-Vid-Flow: the full process as described above.

Table 1 shows results of visual plausibility and motion consistency. Here, the visual plausibility of each frame is measured independently using a Frechet Inception Distance (i.e., FID Score). The FID score of each inpainted frame is computed independently against the collection of ground-truth frames from all background videos from the composed dataset.

TABLE 1

Visual plausibility and motion consistency evaluation

| Method | FID | PSNR | SSIM |
| --- | --- | --- | --- |
| DIP | 22.31 | 19.57 | 0.5577 |
| DIP-Vid | 16.10 | 24.20 | 0.7880 |
| DIP-Vid-3DCN | 12.10 | 27.49 | 0.8788 |
| DIP-Vid-Flow | 10.39 | 28.82 | 0.9018 |

The second column of Table 1 compares average FID scores from inpainting results on all videos in the composed video sets. Further discussion of visual plausibility results are discussed with regard to FIG. 8A.

Figure 8A:
FIG. 8A is a diagram illustrating example comparisons of results from different learning frameworks.

FIG. 8A is a diagram illustrating example comparisons 800 of visual plausibility results from the above-described learning frameworks. The DIP often borrows textures from known regions to fill the mask region, generating incoherent structures in many cases. Training the model over the whole video, as in DIP-Vid, allows the CNN to generate better structures, especially around the boundary of the mask region due to more training data provided by the other frames. Using 3D convolution tends to constrain the larger mask region better than 2D due to the larger context provided by the spatial-temporal volume. The result, however, tends to be more blurry and distorted as the data from the video is usually too small to allow for perfect modeling of the space of spatial-temporal patches. Training the model with the above-described internal learning framework (e.g., framework 400 of FIG. 4) allows the information to be propagated properly across frames which tends to constrain the mask regions with the right information.

Beyond visual quality in each frame, a satisfactory video inpainting result should be consistent between frames. The motion consistency of the video inpainting results is quantified using the following metric. For each 50×50 patch sampled in the mask region at frame t, a patch is found at time t+1 within 20 pixels of the first patch that maximizes peak signal-to-noise ratio (PSNR) between the two patches. The PSNR values are aggregated across the whole mask regions and the average PSNR value is obtained. A structural similarity index (SSIM) is computed similarly. The results are shown in the last two columns of Table 1 and FIG. 8B.

Applying image inpainting frame-by-frame as in DIP is highly inconsistent. DIP-Vid, by training the model over whole video, can leverage spatial context similarly across frames to induce motion consistency to some extent but not perfect due to content mismatch. DIP-Vid-3DCN improves motion consistency with respect to DIP-Vid but the output space of 3D CNN is often too large to be learned sufficiently from a single video. Also, DIP-3DCN tends to mix information from neighboring frames, which results in blurry, misaligned outputs and often leads to inconsistency (see the $3^{rd}$ and $4^{th}$ rows of FIG. 8A). With the consistency loss, the correct information is able to be propagated from the neighboring frames to allow for better consistency with a 2D CNN.

Figure 8B:
FIG. 8B is a diagram illustrating example comparisons of motion consistency.

FIG. 8B is a diagram illustrating a motion consistency comparison 830. In FIG. 8B, consistency visualizations are shown from different inpainting results from "hike" and "flamingo" sequences in DAVIS (corresponding to the first and second rows of FIG. 8B, respectively). It is noted that the strides cut through the mask regions in many frames. As the video progresses smoothly, the visualization from satisfactory video inpainting results should appear smooth. Applying image-inpainting from DIP results in inconsistency between the mask regions and content regions across the video. DIP-Vid and DIP-Vis-3DCN result in significantly smoother visualizations compared to DIP yet still exhibit inconsistent regions. Training the network with the DIP-Vid-Flow, i.e., the above-described improved techniques, on the other hand, gives a smooth visualization indicating high temporal consistency.

The inpainting performance of the above-described improved techniques is now evaluated. The video inpainting results are quantitatively evaluated on the above-described composed dataset for which the ground-truth background videos are available. In addition, inpainting results from the following methods are included for comparison:

Ulyanov: image inpainiting
Yu: image inpainting from external corpus of inputs
Wang: Vid2Vid model trained on large-scale video inpainting data
Newson: video inpainting using patching methods
Huang: video inpainting using patching methods The training set for Vid2Vid contains 1000 video clips of length 30 frames and is constructed with the same procedure used for the above-described composed video set.

TABLE 2

Quantitative evaluation

| Method | PSNR | SSIM |
|---|---|---|
| Ulyanov | 25.81 | 0.9303 |
| Yu | 22.96 | 0.8725 |
| Wang | 25.72 | 0.9128 |
| Newson | 31.52 | 0.9645 |
| Huang | 32.46 | 0.9702 |
| DIP-Vid | 28.11 | 0.9556 |
| DIP-Vid-3DCN | 30.85 | 0.9645 |
| DIP-Vid-Flow | 32.20 | 0.9686 |

Using the ground-truth background videos, the inpainting results are evaluated with the PSNR and SSIM metrics for each frame. The metrics are then aggregated over each video and the average performance is reported in Table 2 and FIG. 8C.

Figure 8C:
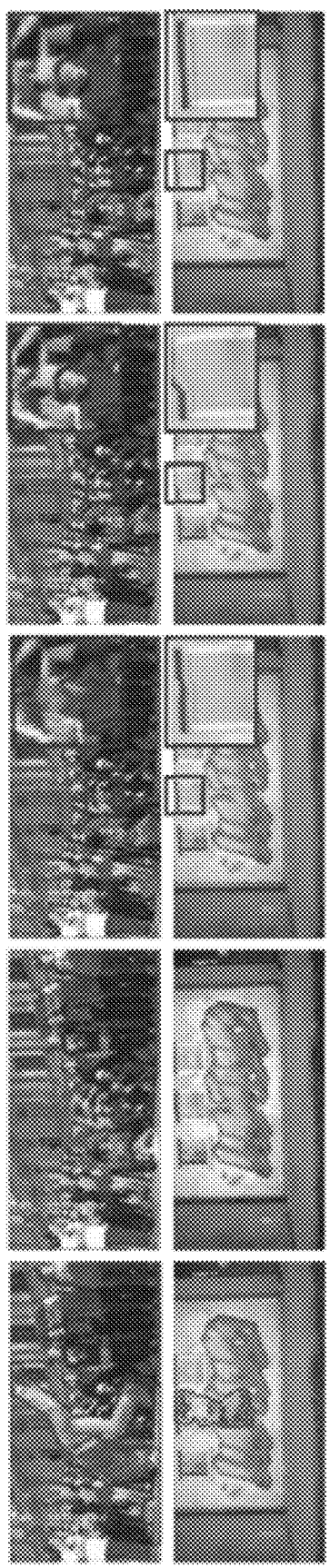
FIG. 8C is a diagram illustrating example results of using a CNN-based video inpainting process.

FIG. 8C is a diagram illustrating video inpainting results 860 using the Wang, Newson, Huang, and the improved techniques described herein. As shown in Table 2 and FIG. 6, the improved techniques are less prone to shape distortion (see the $2^{nd}$ row in FIG. 8C). The simple frame-wise 2D CNN model of the improved techniques (DIP-Vid-Flow), without explicit modeling and large-scale training, performs comparatively with the patch-based methods (Huang and Newson). It is observed that the results of the improved techniques complement those from the patch-based methods in several cases. For example, patch-based methods often rely on explicit patch matching and flow tracking during synthesis which may lead to content inconsistent with the content regions such as the distorted shapes shown in FIG. 8C. The network-based synthesis of the improved techniques make better use of global context. Further, the Vid2Vid framework, while being able to model temporal information reasonably well, requires very large external datasets and advanced model architecture with explicit temporal modeling.

Figure 8D:
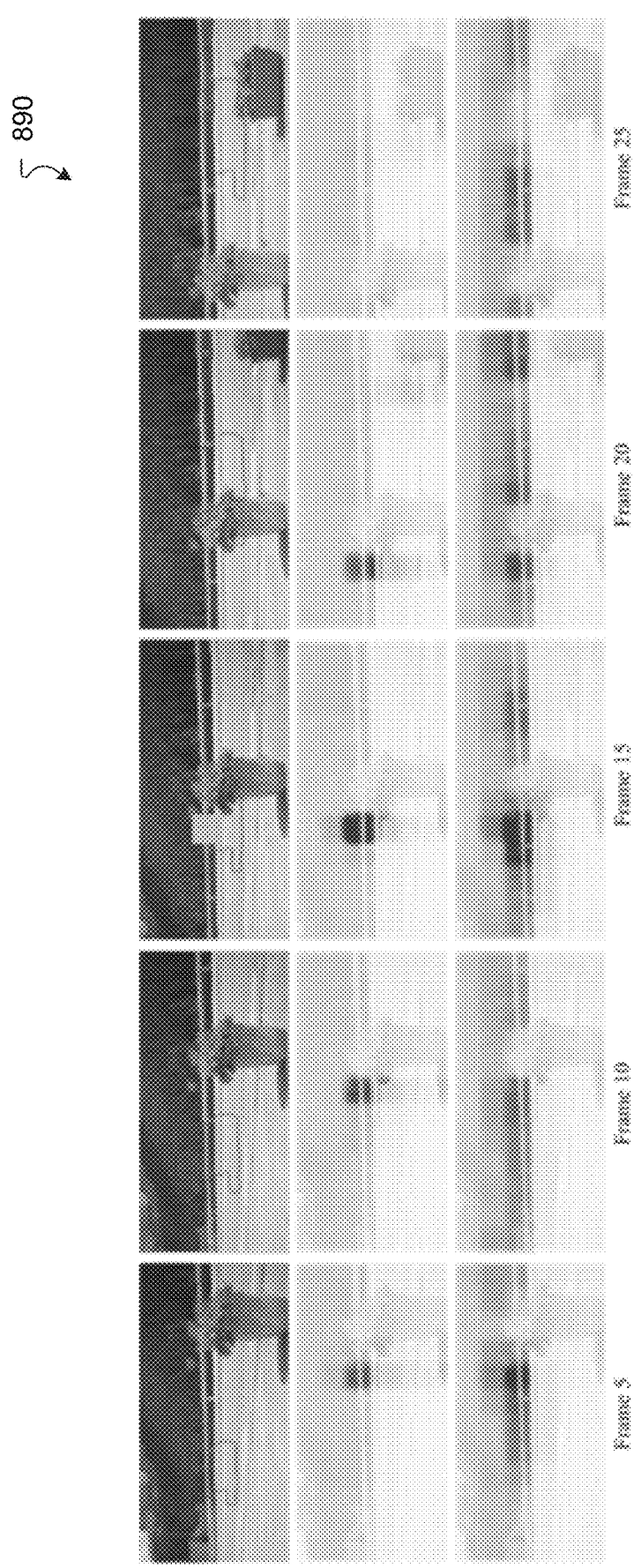
FIG. 8D is a diagram illustrating example feature similarity visualization.

FIG. 8D is a diagram illustrating a feature similarity visualization 890. Alpha values represent the similarity between each patch to the referenced patch in the encoder feature space. The top row shows original frames with outlined mask regions. The middle row shows a visualization using a feature encoded from visual noise according to the improved techniques. The bottom row is a visualization using a VGG16-pool5 feature. The improved techniques tend to identify the exact patch instead of simply searching for similar ones.

A number of embodiments have been described. Nevertheless, it will be understood that various modifications may be made without departing from the spirit and scope of the specification.

In some implementations, generating the sequence of inputs includes producing, as the values of each input of the sequence of inputs, values of a noise map for that input. In some implementations, the values of the noise map are uniformly distributed. In some implementations, the values of the noise map for each input of the sequence of inputs is generated independently of the values of the noise map for the other inputs of the sequence of inputs.

In some implementations, each of the sequence of initial frames includes a content region and a mask region, the content region including target image values, the mask region including image values different from the target image values.

In some implementations, the training operation produces the sequence of final frames based on a loss function, the loss function including a weighted sum of a plurality of components, the plurality of components including an image generation loss function, the image generation loss function being based on differences between the estimated image values of a frame of the sequence of final frames and the target image values in the content region of the frame of the sequence of initial frames to which the frame of the sequence of final frames corresponds. In such an implementation, performing the training operation on the CNN includes performing a minimization operation on the loss function to produce a set of parameters of the CNN that minimizes the loss function.

In some implementations, the plurality of components includes a flow generation loss function, the flow generation loss function being based on a difference between an optical flow of the plurality of optical flows between a pair of frames of the sequence of final frames and a reference optical flow in the content region of the pair of frames of the sequence of initial frames to which the pair of frames of the sequence of final frames correspond.

In some implementations, the reference optical flow is based on an optical flow CNN model.

In some implementations, the flow generation loss function is further based on a masking function that defines a warped mask region of each frame of the initial sequence of frames, the warped mask region being an intersection of the mask region of a frame of the initial sequence of frames and a transformed mask region of the frame of the initial sequence of frames, the transformed mask region being based on the optical flow of the plurality of optical flows between the frame and another frame.

In some implementations, the plurality of components includes a consistency loss function, the consistency loss function being based on a difference between the estimated image values of a frame of the sequence of final frames and image values of a warped frame, the warped frame being warped image values of the frame as transformed by the optical flow between the frame and another frame of the sequence of final frames.

In some implementations, the consistency loss function is evaluated in the mask region of the frame of the sequence of initial frames to which the frame of the sequence of final frames corresponds.

In some implementations, the plurality of components includes a perceptual loss function, the perceptual loss function being based on a difference between a feature extracted from a frame of the sequence of final frames and the feature extracted from the target image values.

In some implementations, each of the plurality of optical flows between a pair of the sequence of final frames is evaluated both forward and backward in time.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    receiving, by processing circuitry of a computer configured to perform video inpainting, initial video data representing a sequence of initial frames;
    generating, by the processing circuitry, a sequence of inputs, each of the sequence of inputs corresponding to a respective initial frame of the sequence of initial frames and having respective input values, wherein each of the sequence of initial frames includes a content region and a mask region, the content region including target image values;
    generating, by the processing circuitry, a neural network including an initial layer and a final layer, the input values of each of the sequence of inputs representing the initial layer of the neural network;
    performing, by the processing circuitry, a training operation on the neural network to produce final video data including a sequence of final frames representing the final layer of the neural network and a plurality of optical flows, wherein the training operation is based on a loss function including a weighted sum of a plurality of components, the plurality of components including an image generation loss function based on differences between estimated image values of the sequence of final frames and the target image values in the content region of the sequence of initial frames, and wherein performing the training operation on the neural network includes performing a minimization operation on the loss function to produce a set of parameters of the neural network that minimizes the loss function; and
    generating, by the processing circuitry, video content based on the final video data, the final video data comprising an inpainted version of the initial video data.

2. The method as in claim 1, wherein generating the sequence of inputs includes producing, as the values of each of the sequence of inputs, values of a noise map for that input.

3. The method as in claim 2, wherein the values of the noise map are uniformly distributed.

4. The method as in claim 2, wherein the values of the noise map for each of the sequence of inputs are generated independently of the values of the noise map for the other input of the sequence of inputs.

5. The method as in claim 1, wherein the plurality of components includes a consistency loss function, the consistency loss function being based on a difference between the estimated image values of a frame of the sequence of final frames and image values of a warped frame, the warped frame being warped image values of the frame as transformed by the optical flow between the frame and another frame of the sequence of final frames.

6. The method as in claim 5, wherein the consistency loss function is evaluated in the mask region of the frame of the sequence of initial frames to which the frame of the sequence of final frames corresponds.

7. The method as in claim 1, wherein the plurality of components includes a perceptual loss function, the perceptual loss function being based on a difference between a feature extracted from a frame of the sequence of final frames and the feature extracted from the target image values.

8. The method as in claim 1, wherein the plurality of components includes a flow generation loss function, the flow generation loss function being based on a difference between an optical flow of the plurality of optical flows between a pair of frames of the sequence of final frames and a reference optical flow in the content region of the pair of frames of the sequence of initial frames to which the pair of frames of the sequence of final frames correspond.

9. A computer program product comprising a nontransitory storage medium, the computer program product including code that, when executed by processing circuitry of a computer configured to perform video inpainting, cause the computer to perform a method, the method comprising:

receiving initial video data representing a sequence of initial frames wherein each of the sequence of initial frames includes a content region and a mask region, the content region including target image values, the mask region including image values different from the target image values;

generating a sequence of inputs, each of the sequence of inputs corresponding to a respective initial frame of the sequence of initial frames and having respective input values;

generating a neural network including an initial layer and a final layer, including the input values of each of the sequence of inputs representing the initial layer of the neural network; and performing a training operation on the neural network to produce final video data including a sequence of final frames representing the final layer of the neural network and a plurality of optical flows between a subset of the sequence of final frames, each of the subset of the sequence of final frames corresponding to a respective initial frame of the sequence of initial frames and including estimated image values based on the plurality of optical flows, wherein the training operation produces the sequence of final frames based on a loss function, the loss function including a weighted sum of a plurality of components, the plurality of components including an image generation loss function, the image generation loss function being based on differences between the estimated image values of a frame of the sequence of final frames and the target image values in the content region of the frame of the sequence of initial frames to which the frame of the sequence of final frames corresponds, and wherein performing the training operation on the neural network includes performing a minimization operation the loss function to produce a set of parameters of the neural network that minimizes the loss function; and rendering the final video data on a display device, the final video data as rendered displaying an inpainted version of the initial video data on the display device.

10. The computer program product as in claim 9, wherein the plurality of components includes a flow generation loss function, the flow generation loss function being based on a difference between an optical flow of the plurality of optical flows between a pair of frames of the sequence of final frames and a reference optical flow in the content region of the pair of frames of the sequence of initial frames to which the pair of frames of the sequence of final frames correspond.

11. The computer program product as in claim 10, wherein the reference optical flow is based on an optical flow CNN model.

12. The computer program product as in claim 10, wherein the flow generation loss function is further based on a masking function that defines a warped mask region of each frame of the initial sequence of frames, the warped mask region being an intersection of the mask region of a frame of the initial sequence of frames and a transformed mask region of the frame of the initial sequence of frames, the transformed mask region being based on the optical flow of the plurality of optical flows between the frame and another frame.

13. The computer program product as in claim 9, wherein generating the sequence of inputs includes producing, as the values of each of the sequence of inputs, values of a noise map for that input.

14. The computer program product as in claim 13, wherein the values of the noise map are uniformly distributed.

15. An electronic apparatus configured to perform video inpainting, the electronic apparatus comprising:

a display interface;
a network interface;
a memory; and
controlling circuitry coupled to the memory, the controlling circuitry being configured to receive initial video data representing a sequence of initial frames, wherein each of the sequence of initial frames includes a content region and a mask region, the content region including target image values, the mask region including image values different from the target image values;

generate a sequence of inputs, each of the sequence of inputs corresponding to a respective initial frame of the sequence of initial frames and having respective input values;

generate a neural network including an initial layer and a final layer, the input values of each of the sequence of inputs representing the initial layer of the neural network; and perform a training operation on the neural network to produce final video data including a sequence of final frames representing the final layer of the neural network and a plurality of optical flows between a subset of the sequence of final frames, each of the subset of the sequence of final frames corresponding to a respective initial frame of the sequence of initial frames and including estimated image values based on the plurality of optical flows, wherein the training operation produces the sequence of final frames based on a loss function, the loss function including a weighted sum of a plurality of components, the plurality of components including an image generation loss function, the image generation loss function being based on differences between the estimated image values of a frame of the sequence of final frames and the target image values in the content region of the frame of the sequence of initial frames to which the frame of the sequence of final frames corresponds, and wherein the controlling circuitry configured to perform the training operation on the neural network is further configured to perform a minimization operation the loss function to produce a set of parameters of the neural network that minimizes the loss function; and render the final video data on a display device, the final video data as rendered displaying an inpainted version of the initial video data on the display device.

16. The electronic apparatus as in claim 15, wherein each of the plurality of optical flows between a pair of the sequence of final frames is evaluated both forward and backward in time.

17. The electronic apparatus as in claim 15, wherein the controlling circuitry configured to generate the sequence of inputs is further configured to produce, as the values of each of the sequence of inputs, values of a noise map for that input.

18. The electronic apparatus as in claim 17, wherein the values of the noise map are uniformly distributed.

19. The electronic apparatus as in claim 17, wherein the values of the noise map for each of the sequence of inputs is generated independently of the values of the noise map for the other input of the sequence of inputs.

\* \* \* \* \*